Sept. 16, 1947.  L. E. WILHELMY  2,427,432
FLUID CLUTCH FOR USE IN AUTOMATIC TRANSMISSIONS
Filed Aug. 10, 1944
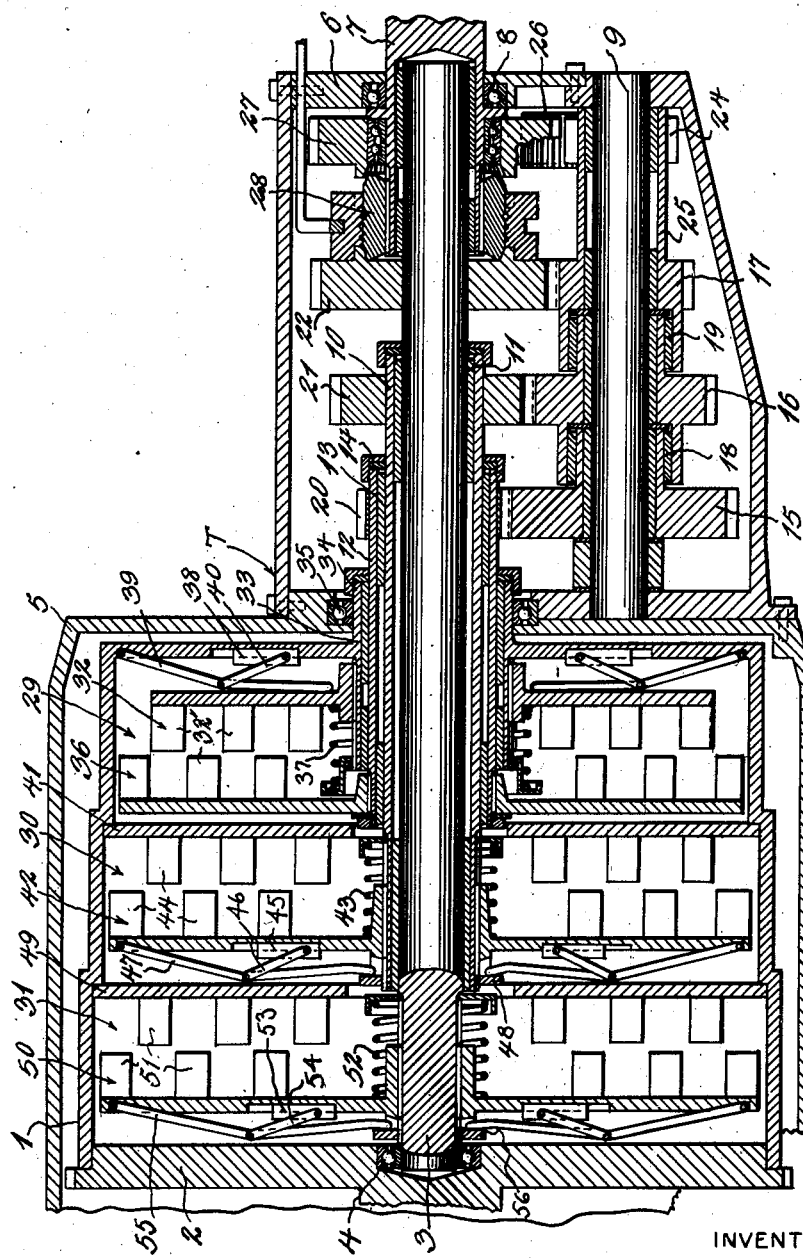
INVENTOR
LINCOLN E. WILHELMY
BY *Young Wright*
ATTORNEYS Patented Sept. 16, 1947

2,427,432

UNITED STATES PATENT OFFICE 2,427,432

FLUID CLUTCH FOR USE IN AUTOMATIC TRANSMISSIONS

Lincoln E. Wilhelmy, Manitowoc, Wis.

Application August 10, 1944, Serial No. 548,825

1 Claim. (Cl. 192—58)

This invention appertains to transmissions and more particularly to a novel speed changing power transmission particularly adopted for use between a prime mover, such as an internal combustion engine, and the work, such as the drive wheels of a motor vehicle.

A salient object of my invention is the provision of a clutch embodying drive and driven members, with means for constantly operating the drive member of the clutch from the engine and means for automatically operating the driven member of the clutch according to either the engine speed, in low gear, or the vehicle speed in the higher gears.

With this and other objects in view, the invention consists in the novel construction, arrangement, and formation of parts, as will be hereinafter more specifically described, claimed, and illustrated in the accompanying drawing, in which drawing the figure is a longitudinal sectional view through my improved variable speed transmission.

Referring to the drawing in detail, the letter T generally indicates my transmission and the same includes a drum 1 rigidly fastened to the fly wheel 2. The drum 1 and the fly wheel 2 form an inclosed housing which is filled with fluid, such as oil. The fly wheel 2 is driven from the engine (not shown) in any preferred way.

Extending axially into the drum is the main drive shaft 3 and the forward end of the same is piloted, as at 4, into the axial center of the fly wheel for free rotation.

The drum 1, itself, can be housed within a suitable casing 5 and this casing also forms a support for the shaft 3, as will be later described. The shaft 3 extends into the gear casing 6 carried by the drum casing 5 and the rear end of the shaft 3 is piloted in the propeller shaft 7 for free rotation. This propeller shaft 7 drives the work, as can be readily understood. Bearings 8 are carried by the casing for rotatably supporting the propeller shaft 7. The gear casing 6 also supports a counter shaft 9.

Rotatably mounted upon the main shaft 3 is a hollow drive shaft 10 and bearings 11 can be placed between the shaft 3 and the hollow shaft 10. A second relatively short hollow shaft 12 is rotatably mounted relative to the shaft 3 and is disposed upon the shaft 10 for free rotation. Anti-friction bearings 13 are placed between the hollow shafts 10 and 12. It is to be noted that the shaft 10 extends beyond the shaft 12 and that these shafts can be provided with stuffing boxes 14.

The drive gear train for the transmission includes freely rotatable speed gears 15, 16 and 17 of the desired size and it is to be noted that the gear 16 is operatively connected to the gear 15 by an over-running clutch 18 and that the gear 17 is operatively connected to the gear 16 by an over-running clutch 19. These gears 15, 16 and 17 are in constant mesh, respectively, with gears 20, 21, and 22. The gears 20 and 15 in conjunction with gears 17 and 22 constitute the driving means for low speed, while the gears 21 and 16 in conjunction with gears 17 and 22 constitute the driving means for the intermediate or second speed. In third speed the drive is direct.

The gear 20 is keyed to the hollow shaft 12, while the gear 21 is keyed to the hollow shaft 10. Gear 22 is keyed directly to the main shaft 3.

Also arranged within the gear casing is the reverse mechanism, which includes a gear 24 keyed to or formed on a sleeve 25 carried by the gear 17. This gear 24 meshes with an idler gear wheel 26, which in turn, meshes with the reverse gear wheel 27 which is rotatably mounted directly on the propeller shaft 7.

Feathered on the propeller shaft 7 is a manually actuated synchro-mesh unit 28 and this unit is adapted to be shifted into either operative engagement with gear 22 or the reverse gear 27 for operatively connecting either one of these gears with the propeller shaft.

Mounted within the drum 1 are fluid clutch units 29, 30, and 31.

The clutch unit 29 includes a drive clutch section 32 which is feathered on the hub sleeve 33 of the drum. This hub sleeve is rotatably mounted on the hollow shaft 12 and suitable bearings 34 can be placed between the hub sleeve and the shaft 12. The hub sleeve is also provided with a stuffing box. The casing 5 carries bearings 35 for rotatably supporting the hub sleeve and consequently this bearing also supports the hollow shafts 10 and 12 as well as a support for the main shaft 3. Facing the drive clutch section 32 is the driven clutch section 36 and these facing clutch sections are provided with any preferred type of buckets or vanes 32'. The driven clutch section 36 is keyed directly to the hollow shaft 12. A coil spring 37 of the desired tension is employed for normally urging the feathered drive clutch section 32 away from the driven clutch section 36. This clutch section 32 is movable toward the clutch section 36 against the tension of the spring 37 automatically, when a certain engine speed is reached by slidable governor weights 38. Movement of the governor weights 38 by centrifugal force operates the push arms 39 through the medium of links 40. The push arms 39, at their outer ends, are pivoted to the drum and their inner ends engage the sliding clutch section 32.

When the engine speed is increased above its fast idle, the centrifugal force generated will throw the weights 38 outward, which will cause the clutch section 32 to be moved axially into the driven clutch section 36 giving a fluid clutch coupling causing the rotation of the hollow shaft 12. The turning of the shaft 12 drives the gear 20, which in turn, drives the gear 15. This gear 15 drives the gears 16 and 17 through the overrunning clutches 18 and 19. Gear 17, in turn, drives the gear 22 and this gear through the synchro-mesh unit 28 drives the propeller shaft 7 and the vehicle will be moved ahead at low speed.

The second hydraulic fluid clutch 30 includes a drive clutch section 41 and a driven clutch section 42. The drive clutch section 41 is secured directly to the drive drum 1. The driven clutch section 42 is feathered on the hollow shaft 10 and is normally urged away from the drive clutch section 41 by an expansion coil spring 43. The driven clutch section 42 feathered on hollow shaft 10 and driving clutch section 41 attached to drum 1 are each provided with facing buckets or vanes 44. In order to move the clutch section 42 into driving relation with the clutch section 41, sliding governor weights 45 are provided. When these governor weights 45 are thrown radially outward by centrifugal force the same actuate, through the medium of links 46, push arms 47. The outer ends of these push arms are pivoted to the clutch section 42 and the inner ends of the arms bear against a pusher plate 48 secured to the hollow shaft 10.

It can be seen that when the vehicle is being driven at low speed that the hollow shaft 10 is also driven through the intermeshing gears 16 and 21. Consequently, the clutch section 42 is rotated with the hollow shaft 10.

When sufficient speed is attained, the governor weights 45 are thrown outward by centrifugal force, which will move the clutch section 42 into driving position relative to the clutch section 41 against the tension of the spring 43 and consequently the clutch section 42 will then be driven from the engine through the drum 1 and the clutch section 41. Now, instead of the clutch section 42 being driven by the gear 21, the same is driven from the clutch section 41, as stated, and hence, gear 21 now rotates the gear 16. Gear 16 through the over-running clutch 19 drives the gear 17, but as the gear 16 is rotating faster than the gear 15, the over-running clutch 18 will be actuated in the opposite direction and hence no movement will be imparted by the gear 16 to the gear 15. The meshing of the gear 17 with the gear 22 will drive the propeller shaft 7 through the synchro-mesh unit 28 and the vehicle will be in second speed.

The clutch unit 31 includes a drive clutch section 49 which is rigidly fastened to the drum 1 and a driven clutch section 50, both of which are provided with facing buckets or vanes 51. The clutch section 50 is feathered on the main shaft 3 for sliding movement and for driving the shaft. An expansion coil spring 52 is provided and normally holds the clutch section 50 out of driving relation with the clutch section 49. Slidably mounted upon the clutch section 50 are governor weights 53 and these governor weights are adapted to actuate, through the medium of links 54, push arms 55. The push arms 55 are pivoted to the clutch section 50 at their outer ends and their inner ends bear against a push plate 56 secured directly to the main shaft 3.

When the vehicle is in second speed and the engine is accelerated and obtains sufficient driving speed, the governor weights 53 will be thrown outwardly, due to the fact that the shaft 3 is driven through the intermeshing gears 21 and 16 and 17 and 22. The movement of the governor weights 53 will push the clutch section 50 against the tension of the spring 52, into driving relation with the clutch section 49 and consequently the clutch section 49 will now drive the clutch section 50 and this clutch section 50 and its shaft 3 will be driven at a higher rate of speed by this direct drive than it is being driven by the second speed clutch through gears 21, 16, 17, and 22. The propeller shaft 7 will now be directly driven from the main shaft 3 through the synchro-mesh unit 28 and consequently, the vehicle will be in high speed. The intermeshing of the gear 22 with the gear 17 will not drive the gear 16 in view of the overrunning clutch 19.

The same action above described, takes place in reverse, except that the reverse gear train 24, 26 and 27 is brought into play by the shifting of the synchro-mesh 28 into driving relation with the gear 27.

Other changes in details may be made without departing from the spirit or the scope of the claim, but what I claim as new is:

In a variable speed transmission mechanism; a fluid clutch including an engine driven drum having fluid therein, a driven rotor clutch section in said drum mounted for turning movement therewith and having vanes thereon, a rotary driven clutch rotor section in said drum having vanes thereon facing the vanes of the drive clutch section, one of said clutch sections being mounted for sliding movement toward and away from the other clutch section, one of said clutch sections having radially extending guideways therein, centrifugal weights slidably mounted in said guideways for outward movement according to the speed of rotation of the drive clutch section, pivoted push levers actuated by said weights for moving the sliding clutch section toward the other clutch section, and spring means normally holding the sliding clutch section away from the other clutch section and the centrifugal weights at the inner ends of the guideways.

LINCOLN E. WILHELMY.

REFERENCES CITED

The following references are of record in the file of this patent:

UNITED STATES PATENTS

| Number | Name | Date |
|---|---|---|
| 1,102,378 | Zeitler | July 7, 1914 |
| 1,795,135 | Molly | Mar. 3, 1931 |
| 2,034,988 | Nilsson et al. | Mar. 24, 1936 |
| 2,055,895 | Fawcett | Sept. 29, 1936 |
| 2,150,151 | Burrows | Mar. 14, 1939 |
| 2,184,941 | Maroto | Dec. 26, 1939 |
| 2,189,537 | Swennes | Feb. 6, 1940 |
| 2,321,226 | McKay | June 8, 1943 |
| 2,359,930 | Miller | Oct. 10, 1944 |
| 2,363,952 | Fillmore | Nov. 28, 1944 |